March 3, 1964 J. S. MUTZIGER 3,123,811

CAM OPERATED SPACER FOR TRANSDUCERS

Filed Feb. 14, 1963

INVENTOR.
JOHN S. MUTZIGER

BY Arthur H. Swanson

ATTORNEY.

United States Patent Office 3,123,811

Patented Mar. 3, 1964

3,123,811

CAM OPERATED SPACER FOR TRANSDUCERS

John S. Mutziger, Littleton, Colo., assignor to Minneapolis-Honeywell Regulator Company, Minneapolis, Minn., a corporation of Delaware Filed Feb. 14, 1963, Ser. No. 258,583
2 Claims. (Cl. 340—174.1)

This invention relates to tape transports. More specifically, the present invention relates to record reproducing and recording head mounting devices.

An object of the present invention is to provide an improved head mounting apparatus.

Another object of the present invention is to provide an improved head mounting means having a facility for correcting an error in the relative spacing of recording and reading heads.

A further object of the present invention is to provide an improved magnetic head mounting means including means operative to compensate for tape stretch during a play back operation of a recording tape.

A still further object of the present invention is to provide an improved compensating means for a head mounting, as set forth herein, having an improved operation and construction.

In accomplishing these and other objects, there has been provided, in accordance with the present invention, a recording and reading head mounting apparatus having a plurality of recording heads and reading heads comprising an eccentrically mounted tape guide positioned between the reading heads to form a segment of recording tape between the reading heads into an arcuate loop. The eccentric mounting of the guide is utilized to selectively vary the length of the tape segment. The length of the tape segment is selected to produce an effective separation of the reading heads equal to the recording heads whereby signals recorded simultaneously on a recording medium are read concurrently.

A better understanding of the present invention may be had from the following detailed description when read in connection with the accompanying drawings, in which.

Figure 1:
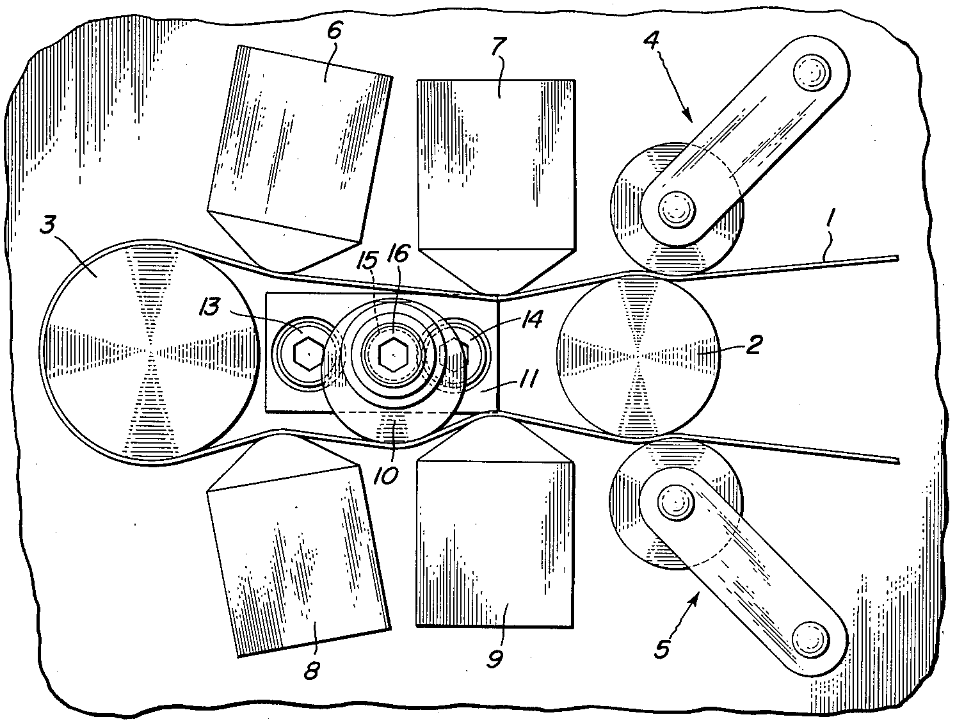
FIG. 1 is a pictorial representation of a recording and reproducing head mounting arrangement embodying the present invention.

Referring to FIG. 1 in more detail, there is shown a magnetic head arrangement embodying the present invention. A closed loop path for a tape 1 is formed by a capstan 2 and a turn-around drum 3. Thus, the tape 1 passes over the capstan 2 at a first point whereon it is held by a first pinch roller mechanism 4. Then, the tape 1 passes around the drum 3 and back over the capstan 2 at a second point whereon it is held by a second pinch roller mechanism 5. A pair of magnetic recording heads 6 and 7 are positioned adjacent to the tape 1 between the first point on the capstan 2 and the roller 3. A pair of tape reading heads 8 and 9 are similarly positioned adjacent to the tape 1 between the roller 3 and the second point on the capstan 2. An eccentrically mounted guide 10 is supported on a base 11 between the heads 8 and 9. The guide 10 is arranged to contact the other side of the tape 1 from that contacted by the heads 8 and 9.

Figure 2:
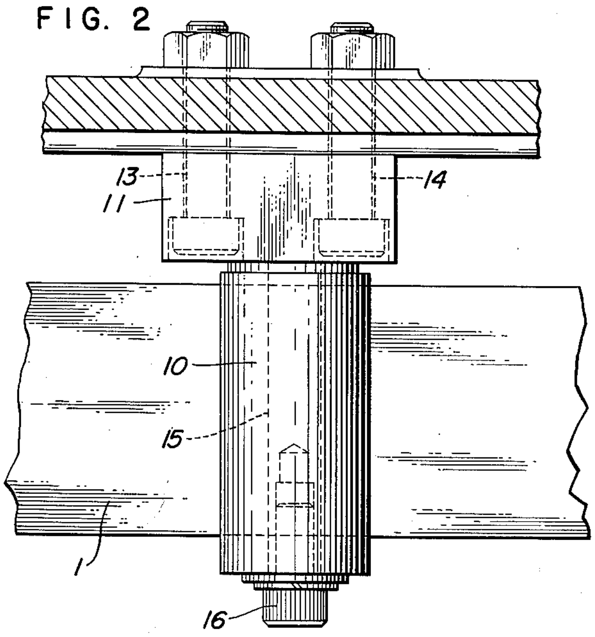
FIG. 2 is a top view of a portion of the arrangement shown in FIG. 1.

In FIG. 2, there is shown a top view of a portion of the head mounting arrangement shown in FIG. 1. This top view is arranged to emphasize the structure of the guide 10. As shown in FIG. 2, the base 11 is secured to a mounting plate 12 for a tape transport by a pair of bolts 13 and 14. The guide 10 is eccentrically mounted on a cylindrical post 15. The cylindrical post 15 is attached at one end to the base 11 and is arranged to extend outward from the base 11 at a right angle thereto. The guide 10 is secured to the post 15 by a locking screw 16.

In operation, the apparatus of the present invention is effective to compensate for an error in the relative placement of the reading heads 8 and 9. The reading heads 8 and 9 are arranged to read alternate record track on the tape 1; e.g., head 8 reads the even-numbered tracks and head 9, the odd-numbered tracks. The recordings on the record track may be interrelated to form a composite output signal. Accordingly, it is necessary to have the signals read by head 8 at the same time as related signals are read by head 9. For example, a first signal is recorded by recording head 6 in a first track on the tape 1, and second signal is, simultaneously, recorded by recording head 7 on a second tape track. Assume the first and second signals are related in a manner which requires that they are simultaneously read by reading heads from the tape 1. In other words, when the first signal reaches reading head 9, it is desirable to have the second signal reach reading 8.

An error in the aforesaid simultaneous reading of the related signals is effected by two principal factors. The first factor is a misplacement of reading heads 8 and 9 whereby their separation is not the same as the separation of the recording heads 6 and 7. This cause of error may be reduced by extreme manufacturing tolerances which are impossible to attain in mass production. The second factor tending to produce a reading error is transient tape stretch induced by the tape transport mechanism. Thus, changes in the tape tension induced by reel take-up motors between the time that the signals were recorded and the time of reading will appreciably delay the reading of the first signal with respect to the second signal. It is to be noted that the tension may be constant for a particular tape transport unless components of the drive train are replaced. However, the recorded tape may be played back on another transport which may have different tension characteristics from the transport used during the recording operation.

The device of the present invention is used to adjust the length of the tape segment between the first reading head 8 and the second reading head 9. Thus, the guide 10 is arranged to form this segment of the tape 1 into an arcuate curve between the heads 8 and 9. The eccentric mounting of the guide 10 is effective to vary the length of the aforesaid segment. Accordingly, the locking screw 16 is loosened on the post 15 to allow a rotation of the guide 10. The guide 10 is, then, rotated in a direction to produce a simultaneous reading of related recorded signals by the heads 8 and 9. The lock 16 is tightened to retain the guide 10 in the desired position whereby the related signals are correctly sensed by the heads 8 and 9.

Thus, it may be seen that there has been provided, in accordance with the present invention, a magnetic head mounting means having a provision for correcting an error in the operative relationship between a recording medium and cooperating magnetic heads.

What is claimed is:

1. A record reading and recording head apparatus comprising, in combination, a plurality of tape recording heads including at least two recording heads, a plurality of tape reading heads including at least two reading heads, said recording heads and said reading heads being longitudinally spaced along a recording tape and cooperating therewith, and a tape guide means positioned between said reading heads and arranged to form a recording tape into an arcuate curve between said reading heads, said tape guide means including eccentric mounting means operative to selectively vary the curvature of said arcuate curve whereby the length of recording tape between said reading heads may be made equal to a spatial separation of said recording heads.

2. A record reading and recording head apparatus, as set forth in claim 1, wherein said guide means comprises a tape supporting guide, a post for eccentrically mounting said guide and a locking means operative to secure said guide to said post in a desired eccentric position.

No references cited.